United States Patent
Raley et al.

(10) Patent No.: US 9,286,808 B1
(45) Date of Patent: Mar. 15, 2016

(54) ELECTRONIC METHOD FOR GUIDANCE AND FEEDBACK ON MUSICAL INSTRUMENTAL TECHNIQUE

(75) Inventors: K. Paul Raley, Lawrenceville, GA (US); Howard A. Carnes, Suwanee, GA (US)

(73) Assignee: PRA Audio Systems, LLC, Lawrenceville, GA (US)

(*) Notice: Subject to any disclaimer, the term of this patent is extended or adjusted under 35 U.S.C. 154(b) by 0 days.

(21) Appl. No.: 13/134,533

(22) Filed: Jun. 9, 2011

Related U.S. Application Data

(63) Continuation-in-part of application No. 13/134,327, filed on Jun. 4, 2011, now Pat. No. 8,633,370.

(60) Provisional application No. 61/397,374, filed on Jun. 10, 2010, provisional application No. 61/397,375, filed on Jun. 10, 2010.

(51) Int. Cl.
*G10H 1/36* (2006.01)
*G09B 15/00* (2006.01)

(52) U.S. Cl.
CPC .................................. *G09B 15/003* (2013.01)

(58) Field of Classification Search
USPC ........ 84/470 R, 477 R, 723, 634; 463/31, 36, 463/37
See application file for complete search history.

(56) References Cited

U.S. PATENT DOCUMENTS

| | | | | |
|---|---|---|---|---|
| 4,025,721 A | * | 5/1977 | Graupe et al. | 704/227 |
| 5,148,488 A | * | 9/1992 | Chen et al. | 704/219 |
| 6,296,489 B1 | * | 10/2001 | Blass et al. | 434/185 |
| 7,919,705 B2 | * | 4/2011 | Miller | 84/616 |
| 2006/0117935 A1 | * | 6/2006 | Sitrick | 84/477 R |
| 2011/0252944 A1 | * | 10/2011 | Humphrey | 84/470 R |

\* cited by examiner

*Primary Examiner* — Jianchun Qin
(74) *Attorney, Agent, or Firm* — Denton Intellectual Property Law Firm; F. Russell Denton, Esq.

(57) ABSTRACT

The invention provides an electronic method for assessing student skills on a stringed musical instrument, based on comparing the digital signature of an expert template sound to the digital signature of a student's attempt to replicate the template on the stringed instrument. In particular the method employs in sequential series an audio input device, an analog-to-digital converter, an audio correlation decoder, a digital-to-analog converter, and an audio output device; in certain embodiments they are all under the control of the same central control processor, which also has access to a first addressable data memory including unprocessed emulations from a student, a logic filter circuit element, a second addressable data memory including emulations from the student that have been filtered to remove background noise and other extraneous elements, and an addressable data memory including expert templates for incremental components of stringed musical performance.

20 Claims, 12 Drawing Sheets

Caricature of an illustrative system for use with the invention method, including devices for producing a template stringed musical sound and for a student's attempt to reproduce it.

Figure 1: Caricature of an illustrative system for use with the invention method, including devices for producing a template stringed musical sound and for a student's attempt to reproduce it.

Figure 2: Caricature of vibration modes for a single string on an instrument, as varied by the location of finger placement on the string.

Figure 3: Caricature illustrating a typical musical wave shape in the time domain.

Figure 4: Caricature illustrating the sequence of logic functions in a particular embodiment of the invention method.

Figure 5: Caricature illustrating the interrelationship of digital processing steps for comparing and scoring a student's stringed performance against a norm in a particular embodiment of the invention method.

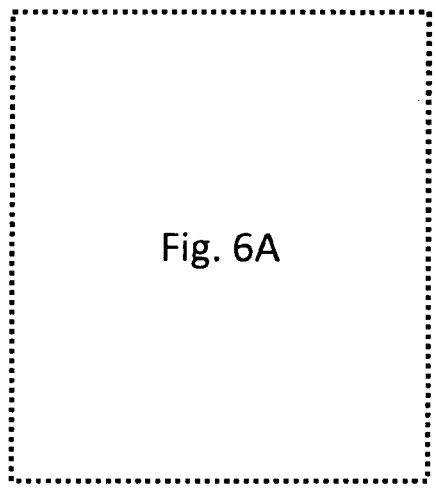
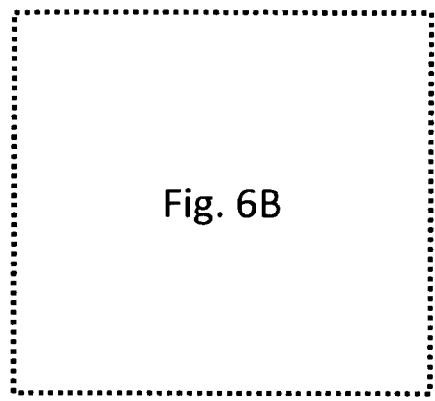
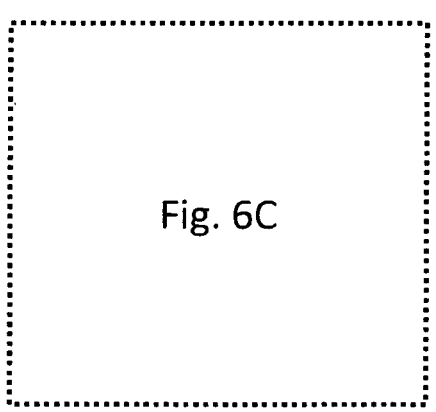
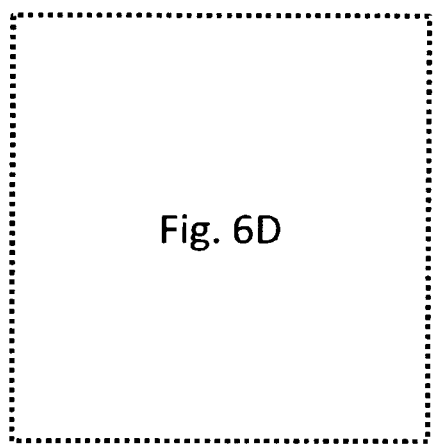
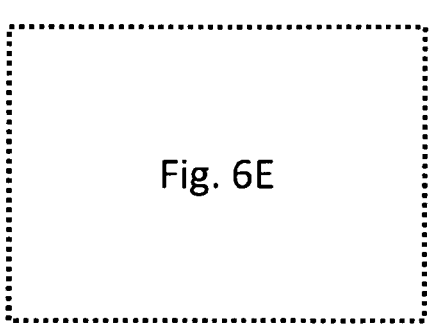
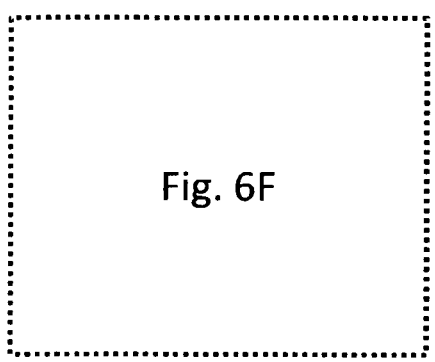
Fig. 6

ELECTRONIC METHOD FOR GUIDANCE AND FEEDBACK ON MUSICAL INSTRUMENTAL TECHNIQUE

CROSS-REFERENCE TO RELATED APPLICATIONS

This application claims priority to U.S. provisional patent applications 61/397,374 and 61/397,375 respectively entitled "Wireless Apparatus for Guitar Training and Practice" and "Method to Convey Signals Generated by Musical Instruments to a Load Speaker with Digital Audio Processing and Audio Effects Mixing Panels", both filed Jun. 10, 2010. This application is a continuation-in-part of a U.S. non-provisional utility patent application Ser. No. 13/134,327, filed Jun. 4, 2011 and entitled "Improved Method to Process Music Digitally with High Fidelity".

BACKGROUND OF THE INVENTION (1) Field of the Invention

The present invention relates to electronic methods for teaching students to play a stringed musical instrument.

(2) Description of Related Art

Many music students find stringed instruments appealing because they appear to be simple to play and yet produce a rich variety of sounds and types of music. The musician excites the array of parallel strings with one hand, often with a simple pluck or strum. The musician's other hand manipulates the vibrating length of each string by holding them down with the other hand in a fixed, seemingly simple pattern.

Yet stringed instruments pose unique challenges, and this is particularly true for popular music genres such as rock, heavy metal, jazz, blues, bluegrass, folk, and country-western music as well for genres of more recent origin. Strings buzz or are muted on frets if mis-fingered there. Fret boards may feel cramped. Skill requires rapid changes and knowledge of numerous complex chord fingerings and arpeggios. Much popular music for stringed instruments requires a player to engage in string bending, string "hammering", or precisely controlled rates of amplitude attenuation. Unlike key boards, the visual layout of a fret board for a stringed instrument does not highlight or clarify the complex relationships between notes in music theory. And an instrument such as the violin (fiddle) lacks frets altogether, making it still more difficult to obtain the exact harmonics desired from a string. Even plucking, strumming and use of a capo or slide are more difficult than they appear to be. Indeed, new players commonly must invest several weeks or months of diligent practice before they have a consistently crisp-sounding performance for even a simple piece.

Tutoring by an expert player helps to overcome these difficulties, and of course it is common for students of many types of instruments to take one-on-one or semi-private music lessons from a music teacher in regular sessions of up to one hour in length per lesson, in an ongoing working relationship that often continues for several years. However studying under an instructor can be an arduous and sometimes expensive process, and the student is often still required to invest 1 to 2 hours per day of practice on his or her own time in order to improve. Moreover it is well known among musical educators that guitar students (in particular) as well as students of mandolin and banjo and other popular stringed instruments tend to include an unusually large proportion of very serious music students who skip most or all formalistic musical training, and attempt to learn to "play by ear," i.e., these students are often self-taught and may not even read music. Thus these students receive little if any formal coaching or feedback in their attempts to achieve desired sounds from their chosen instruments.

Some of the resistance to formal training arises from the tedium. A common type of drill for music students is the repetitive playing of patterns such as scales, arpeggios, chords or rhythms. Scales and chords are taught, for instance, as the building blocks of melody in Western culture. Arpeggios are taught to develop dexterity in the tone-selecting hand (usually the left hand) and to improve a student's timing. In addition, some musical exercises are designed to improve manual flexibility, to make it physically easier to play the instrument. And so forth. Many volumes of etudes have been written for these various types of drills. However in the present video-dominated era students are increasingly less interested in learning from a text book or from instrumental homework books. Thus music students are seeking a more interactive learning experience even in their self-directed studies.

Consequently there is an ongoing and growing need for devices and methods that can provide interactive guidance and feedback to students who play stringed musical instruments.

BRIEF SUMMARY OF THE INVENTION

The invention provides an electronic method for providing feedback on performance skill in the playing of a stringed musical instrument. In certain embodiments the invention provides a method to use the signatures of audible sound to assess a student's attempt to replicate the sound of an expert template. In particular the method employs in sequential series an audio input device, an analog-to-digital converter, an audio correlation decoder, a digital-to-analog converter, and an audio output device; in certain embodiments they are all under the control of the same central control processor, which also has access to a first addressable data memory comprising unprocessed emulations from a student, a second addressable data memory comprising filtered emulations from the student, and an addressable data memory comprising expert templates for incremental components of stringed musical performance.

In a particular embodiment the invention is an electronic method for tutoring a student to use a stringed musical instrument, wherein the method comprises:
(a) selecting a lesson topic from an electronic menu;
(b) activating the selected lesson topic, wherein the activation comprises the steps of:
  (i) retrieving the selected lesson topic from a memory component by means of a control processor;
  (ii) identifying a digital musical template corresponding to the lesson topic by means of the control processor;
  (iii) storing the digital template in memory associated with a correlator for subsequent comparison to a played emulation from the student;
  (iv) transforming the template to analog form by means of a digital to analog converter device; and
  (v) transforming the template analog form to an audible sound by means of an audio output device; wherein steps (iii) and (iv) may be performed in any order relative to each other;
(c) pre-treating the student's emulation of the audible sound from the template, wherein the pre-treatment comprises the following steps:
  (i) receiving the student's emulation by means of an audio input device that transforms audible sound to an analog electrical signal;

(ii) transforming the analog electrical signal from the student emulation to digital form in an analog-to-digital converter device;

(iii) optionally processing the student's emulation resulting from steps (i) or (ii) in a logic filter element to reduce extraneous elements of sound;

(iv) storing the digitized, optionally filtered emulation in a memory associated with a correlator for subsequent comparison to the digital template;

(d) providing a comparative assessment at a correlator device, comprising the steps of:

(i) comparing the digital musical template and the digitized, optionally filtered emulation with regard to at least one attribute selected from the group consisting of frequency, rate of frequency change, wavelength, rate of wavelength change, amplitude, rate of amplitude change, wavelength phase, rate of wavelength phase change, articulation quality of notes, timing between notes, promptness in emulating, and consistency of repeated emulations with respect to any of these attributes;

(ii) assigning a performance score to the quality of the match between the digitized, optionally filtered emulation and the digital musical template that it emulated;

(iii) reporting the performance score; and (iv) optionally providing feedback information that is retrieved from a memory device and or that is programmed, wherein the feedback information corresponds to a performance score that is identified as being in a comparable range for at least one attribute of the comparative assessment as reported.

BRIEF DESCRIPTION OF THE SEVERAL VIEWS OF THE DRAWINGS

FIG. 6 depicts a caricature of piecewise juxtaposition and interrelationships of the electrical circuit portions depicted in FIGS. 6A, 6B, 6C, 6D, 6E and 6F that, when taken all together, depict the whole of an illustrative embodiment of the invention that has been made and shown to work as described herein.

DETAILED DESCRIPTION OF THE INVENTION

Figure 1:
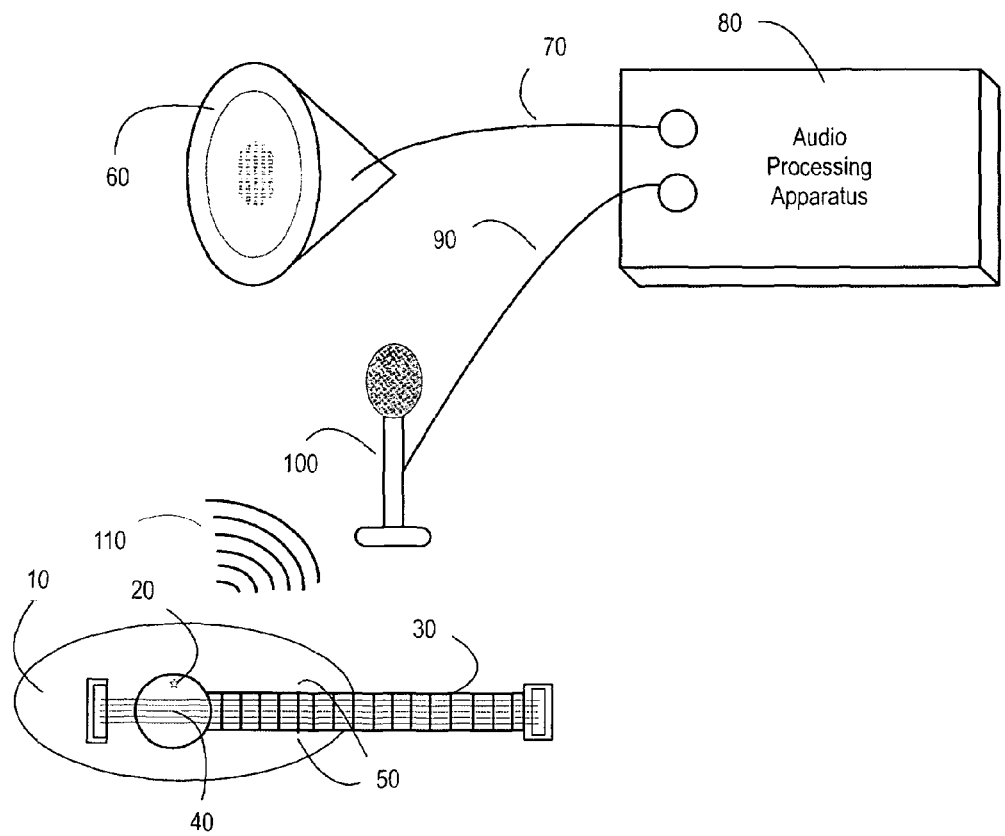
FIG. 1 shows a caricature of an illustrative system for use with the invention method, depicting devices for producing a template stringed musical sound and for a student's attempt to reproduce it

The invention may be further understood by the following description and illustrations. The definitions below clarify the scope of terms used for that purpose herein.

DEFINITIONS

The term "stringed instrument" has its usual and ordinary meaning in music, and includes all manner of stringed instruments, including but not limited to 6-string guitars, 12-string guitars, double neck guitars, bass guitars, mandolins, dulcimers, ukuleles, harps, violins, violas, violoncellos, contrabasses, and double basses, among others. The term stringed instrument as used herein includes both acoustic instruments and electric instruments, for instance it includes both acoustic guitars and electric guitars. The term stringed instrument as used herein is not limited by the musical key, range or modality for which an instrument is designed, modified, tuned or played.

The term "instrumentals" refers to the component of a musical performance that arises from the use of one or more musical instruments.

The term "performance" refers to the playing of any type of music for any purpose, whether for an audience, practice, studio recording or other purpose, where the performance has stringed instrumental elements. In particular embodiments the term performance includes performance of music for purposes of practice and skill development.

The term "template" refers to a sound or series of sounds that are provided as an expert example that a student should attempt to emulate. The template sounds are those of a stringed musical instrument as played by an expert, i.e., by a skillful player.

The term "emulate" refers to an attempt to replicate, mimic or otherwise copy a template sound, wherein the emulation is performed on a stringed musical instrument.

The term "audible" refers to a sound that is within the frequency range of human hearing.

The term "analog" as used with respect to electrical signals has its usual meaning in audio electrical engineering.

The term "digital" has its usual meaning in electrical and computer engineering.

The term "noise ingress", "noise egress" and "noise ingress/egress" refer to sound that is generated when electrically powered equipment radiates unprogrammed radiofrequency and or audio-range signals as a result of electromagnetic fields that are an incidental and unwanted byproduct of their circuit designs, to the extent that the resulting ambient sound is received by an electronic audio pickup component at an instrument and or at a vocal microphone. Noise ingress may occur when the undesirable sound enters the sound box of a stringed instrument; noise egress may occur when its echo inside the box exits the sound box.

The term "internal noise" refers to undesired sound that is generated when electrically powered equipment radiates unprogrammed radiofrequency and or audio-range signals as a result of electromagnetic fields that are an incidental and unwanted byproduct of the circuit design of a musical instrument's own in-line electronics. The electronics generating internal noise may be intrinsic to the instrument's construction, as in an electric guitar. Alternatively the electronics generating internal noise may be in a complementary circuit, as in a removable pick-up circuit that has been placed on an acoustic guitar. Linear audio equipment in particular is a source of internal noise.

The term "extraneous elements of sound" refer to background noise that does not originate in the playing of a stringed instrument with which the invention is being used, or that represent only minor deviations from an ideal. An illustrative non-exclusive list of sources of such extraneous elements includes: a human voice; electrical noise in the range of 50 to 60 Hz arising from nearby power sources; and electrical noise from electronic devices that are in-line with the stringed instrument, such as an amplifier or monitor. Another source of extraneous sound elements is deviations from perfection that do not exceed pragmatic norms; such deviations commonly occur in tuning of the instrument, replicating amplitudes, timing and so forth. For instance, even an expert player may have slight deviations when emulating a template he created himself; likewise an expert player may also have trivial deviations when emulating a template that another expert player created. Thus it is desirable to reduce or eliminate the prominence of extraneous elements of sound in order to have a true basis for comparing the skill of a student's emulation to an expert's skill as embodied in a template sound.

The term "lesson topic" refers to an incremental component of skill on a stringed instrument for which tutorial material and or a sound template to be emulated is stored in a memory. An illustrative non-exclusive list of lesson topics includes notes, arpeggios, scales, chords, modes, timing, rhythms, time signatures, melodies, harmonies, and quickness to emulate.

The term "activating" as used with respect to a lesson topic refers to selecting the topic for recall from an electronically stored menu such as a list, display, index or table of contents. In particular embodiments the selection is performed by means of a control processor that retrieves from a memory component a selected lesson topic and or a template sound that corresponds to that lesson topic, and transfers that data to an audio correlation decoder device. An illustrative, non-exclusive list of means that may be used for selection include mouse clicks, voice commands, touch screens, typed codes, programmed instructions from an algorithm, randomized choices from an algorithm, and instructions sent wirelessly from a remote control device.

The term "control processor" refers to an integrated circuit device such as a microcontroller or microprocessor. A microprocessor is similar to a microcontroller but includes a higher level of processing and memory capacity, and is often referred to as an ARM device. An illustrative, non-exclusive example of a control processor suitable for the invention is a Texas Instrument (TI), AM389X microprocessor. In certain embodiments of the invention the control processor is a digital signal processor.

The term "central control processor" refers to a control processor that is in electronic communication with all of the following devices: one or more memory devices, an audio input device, an analog-to-digital converter (ADC), an audio correlation decoder, a digital-to-analog converter (DAC) and an audio output device. The term "under the control" as used with respect to a circuit component that is managed by a control processor refers to programming or other instructions that originate at the processor and guide the activity of the circuit component. The control processor may be hardwired as with firmware from a manufacturer and or may be programmed as for instance by a human user. In certain embodiments of the invention the control processor is a digital signal processor.

The term "audio input device" refers to a device that transforms audible sound into an analog electrical signal. An illustrative nonexclusive list of audio input devices includes microphones, piezoelectric transducers, and electromagnetic pick-up sensors.

The terms "analog-to-digital converter" (ADC) and "digital-to-analog converter" (DAC) have their usual and ordinary meaning in the field of electrical engineering.

The term "audio output device" refers to a device that transforms analog electrical signals into audible sounds. An illustrative nonexclusive list of audio output devices includes loudspeakers, amplifiers, headphones, and piezoelectric transducers.

The term "audio correlation decoder" refers to a device containing a logic circuit that is programmed to: compare the digital signatures of two different sound waves; to evaluate their differences and relative similarity; and to report a score or ranking for the relative quality of the match between the two digital signatures. In particular embodiments the audio correlation decoders is programmed to compare the digital signatures with respect to at least one of the following sound wave attributes: frequency, rate of frequency change, wavelength, rate of wavelength change, amplitude, rate of amplitude change, wavelength phase, rate of wavelength phase change, articulation quality of notes, timing between notes, promptness in emulating, and consistency of repeated emulations with respect to any of these attributes. In particular embodiments the decoder is a field programmable gate array (FPGA) device. A well-suited FPGA is the Altera Stratix II, EP2S60, but FPGAs from other manufacturers can also suffice.

The terms "frequency", "wavelength", "amplitude", and "rate of change" have their usual meanings from the physics of sound waves.

The term "articulation" as used with respect to the playing of notes refers to distinctness in the onset of a played musical note and in the termination of that note, and includes playing of the note without unwanted playing of an additional note that is not part of the template.

The term "wireless" refers to any wireless means of telecommunication, including radiofrequency waves, infrared signals, microwaves, visible optical waves, and other wireless means such as are known in telephony.

Figure 5:
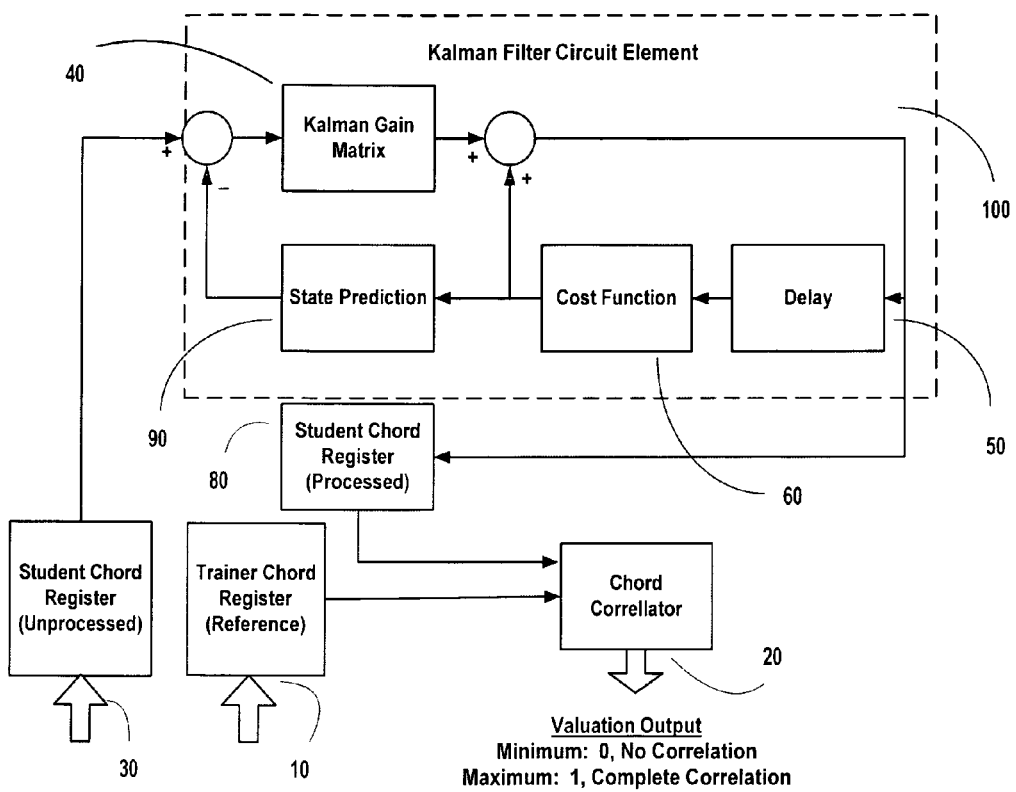
FIG. 5 shows a caricature illustrating the interrelationship of digital processing steps for comparing and scoring a student's stringed performance against a norm in a particular embodiment of the invention method.
Figure 6A:
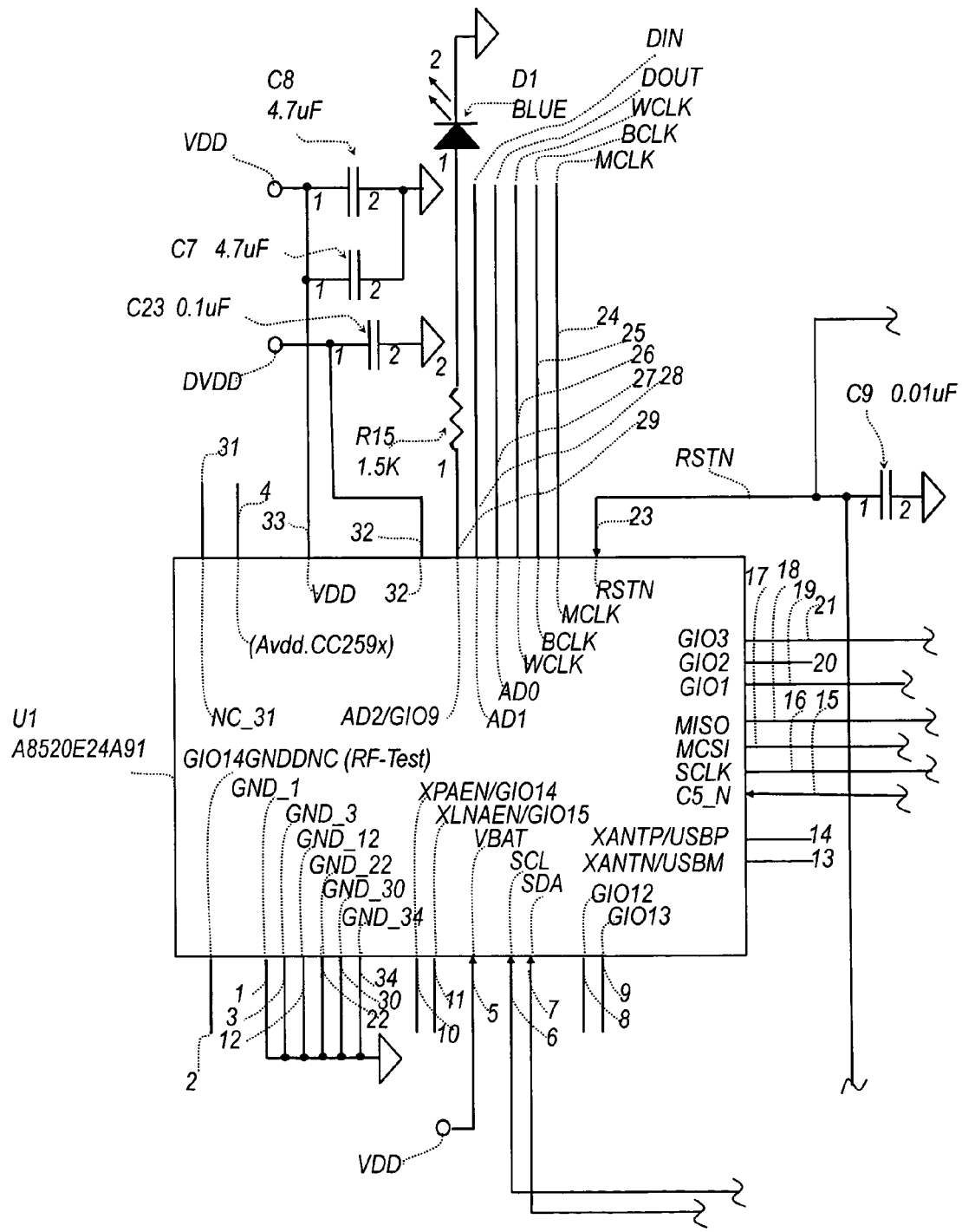
FIG. 6A depicts a caricature of an upper left portion of an electrical circuit according to the invention.
Figure 6B:
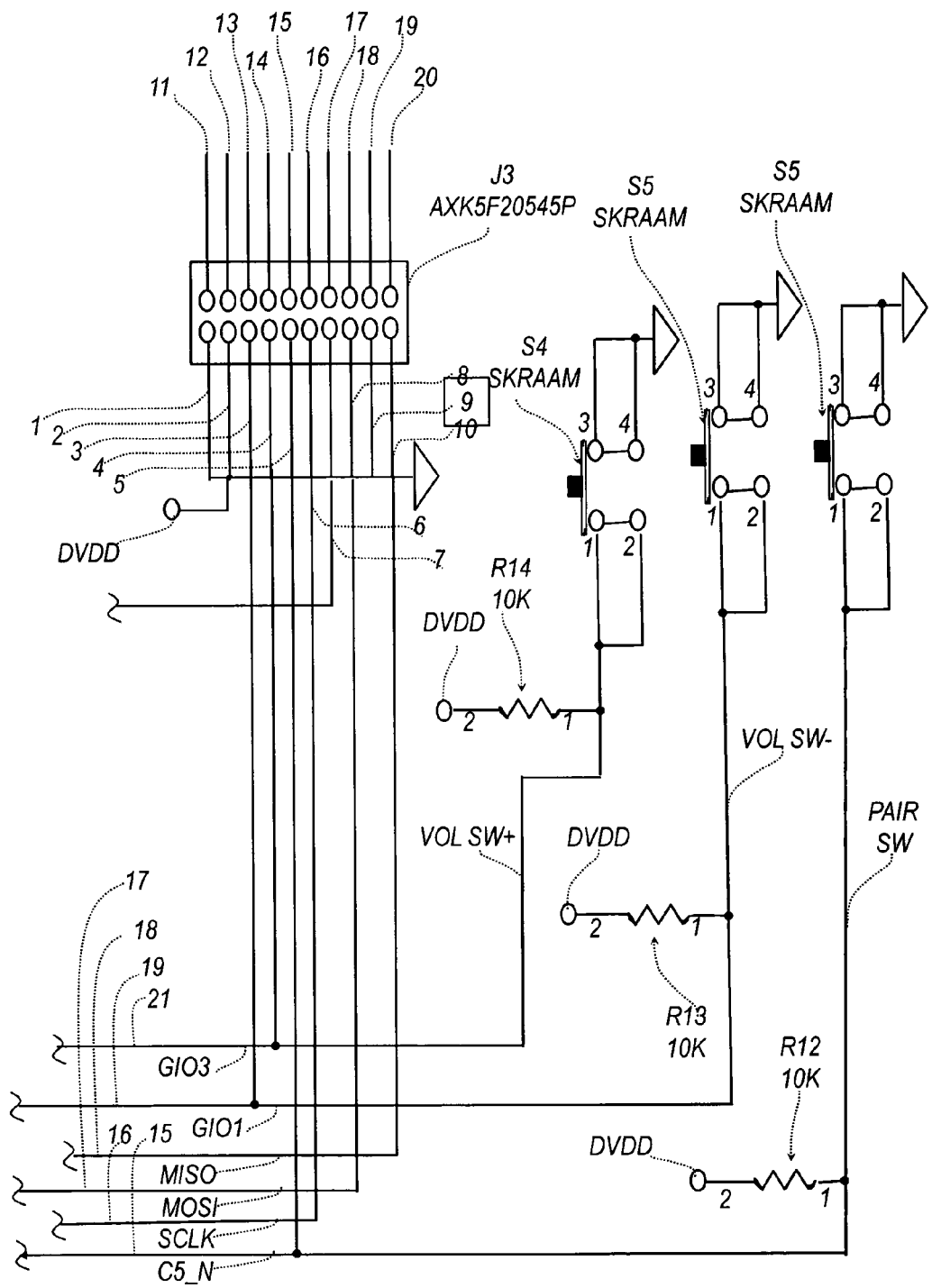
FIG. 6B depicts a caricature of an upper right portion of an electrical circuit according to the invention.
Figure 6C:
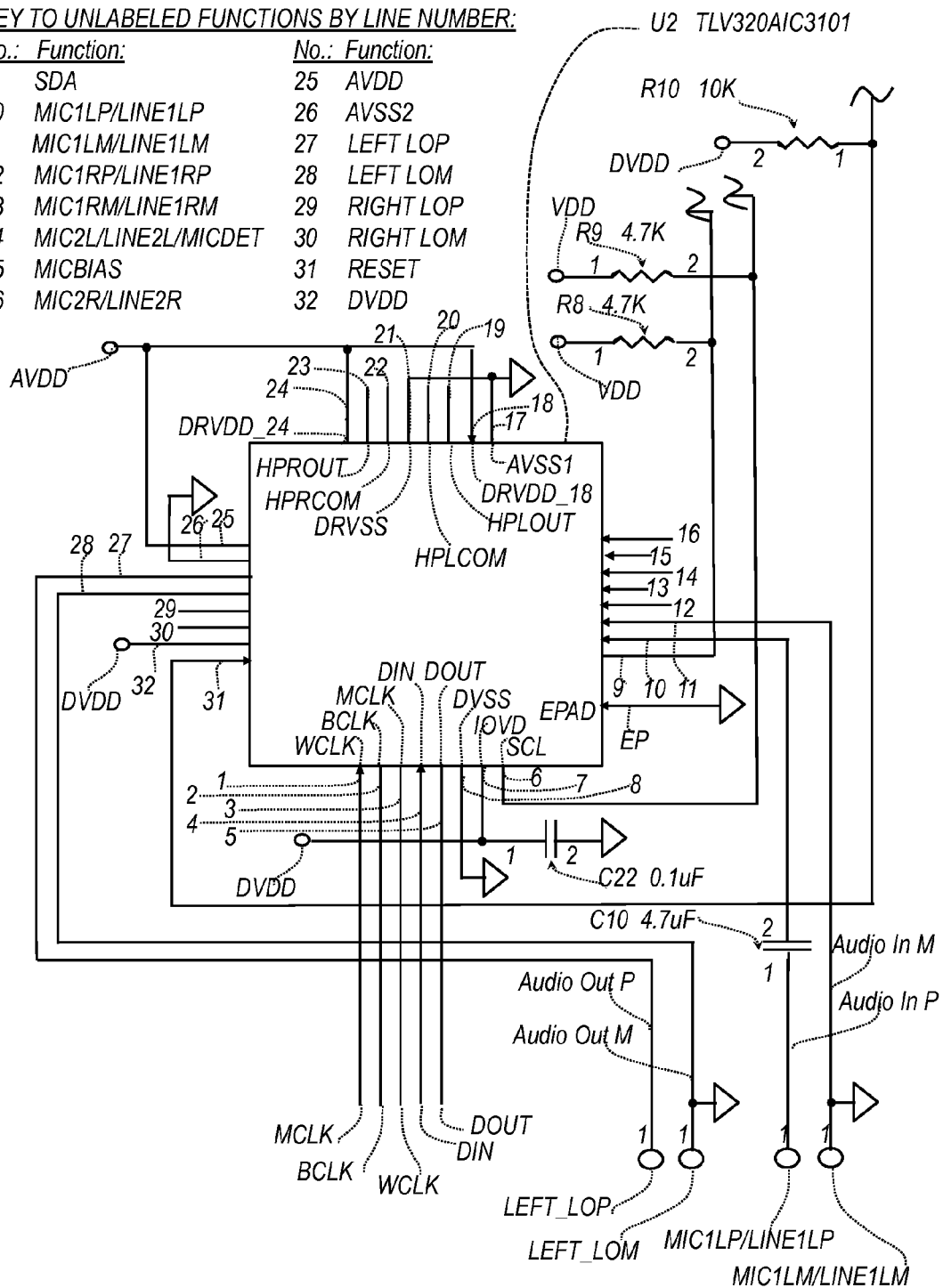
FIG. 6C depicts a caricature of a left central portion of an electrical circuit according to the invention.
Figure 6D:
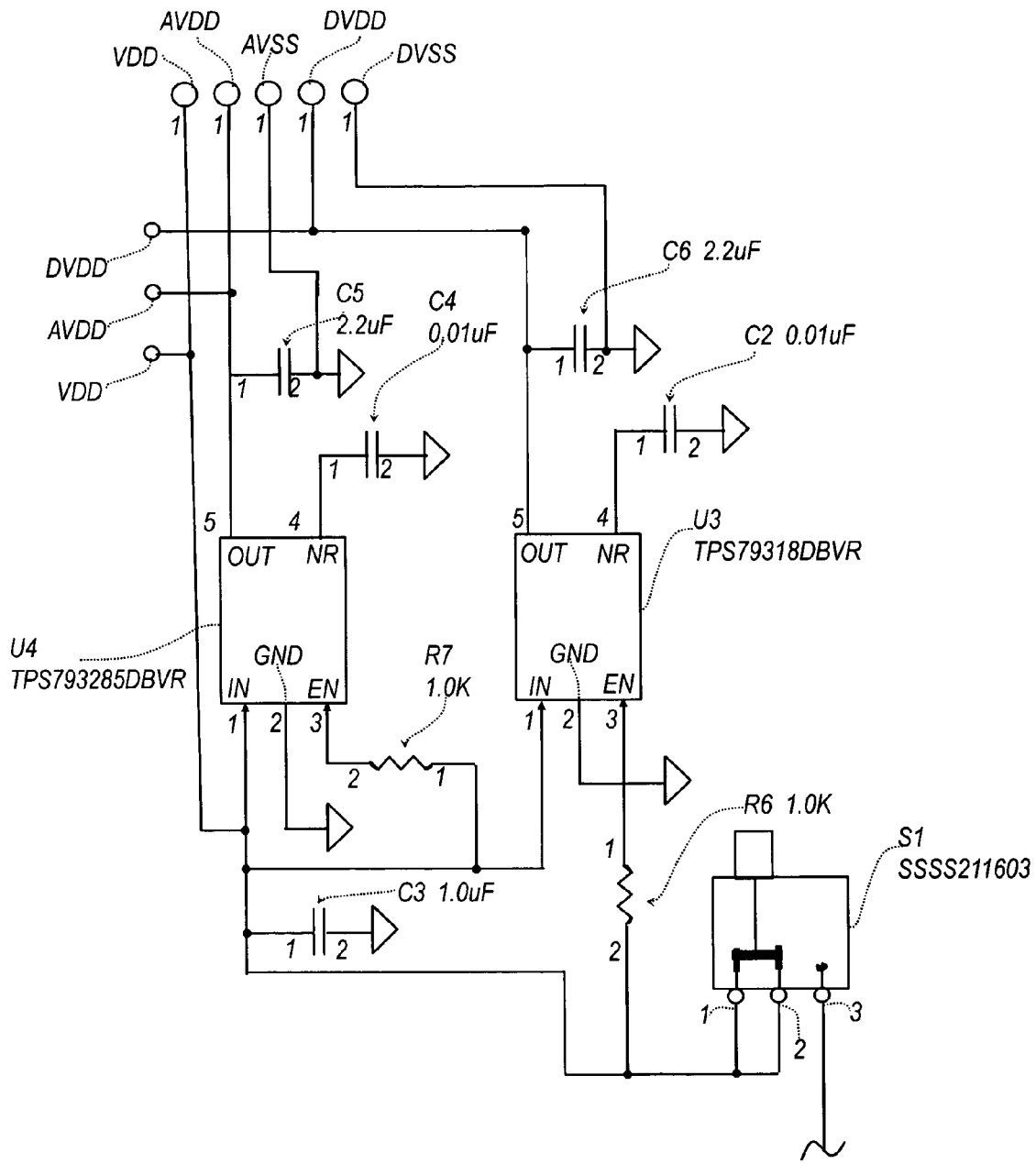
FIG. 6D depicts a caricature of a right central portion of an electrical circuit according to the invention.
Figure 6E:
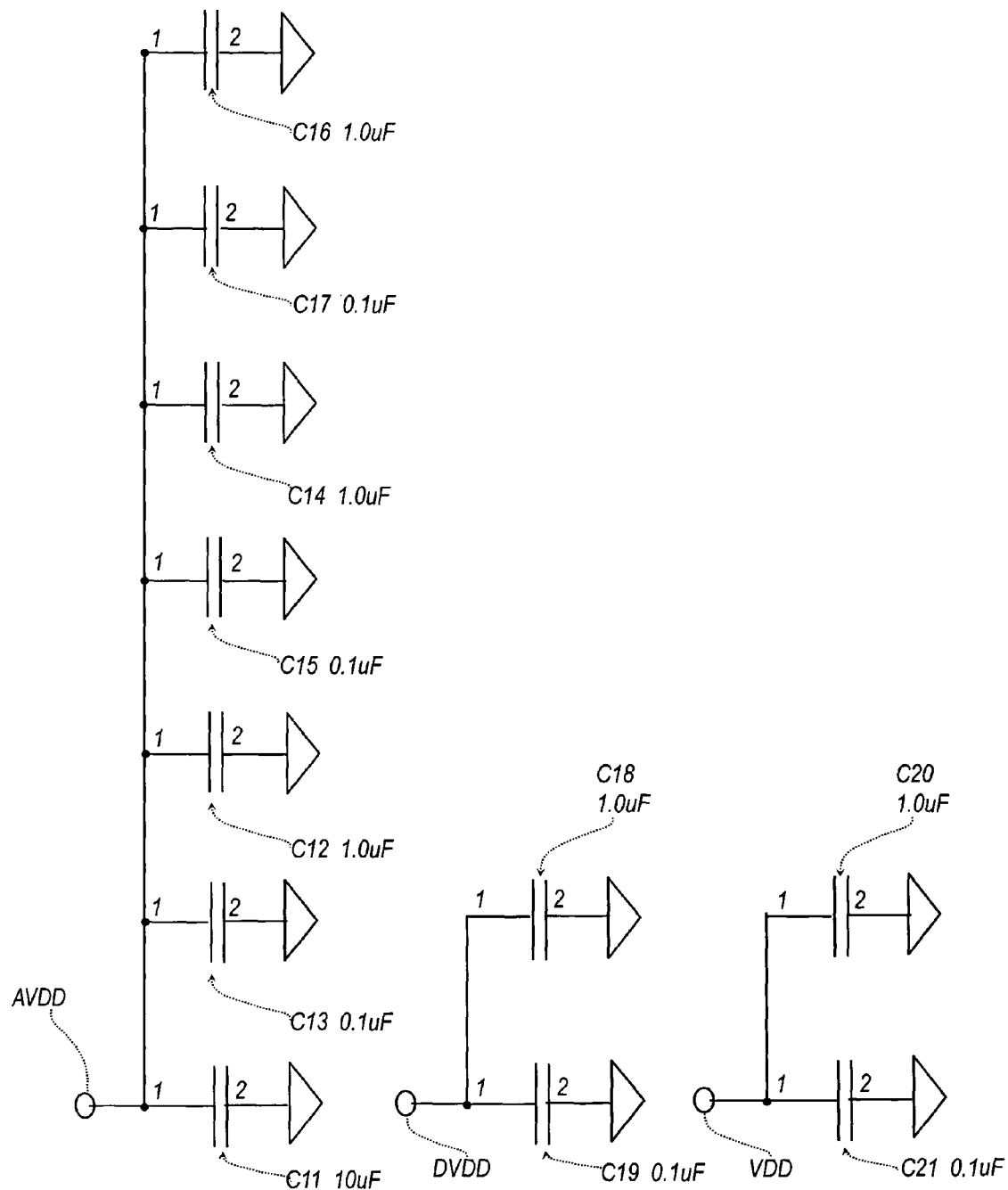
FIG. 6E depicts a caricature of a lower left portion of an electrical circuit according to the invention.
Figure 6F:
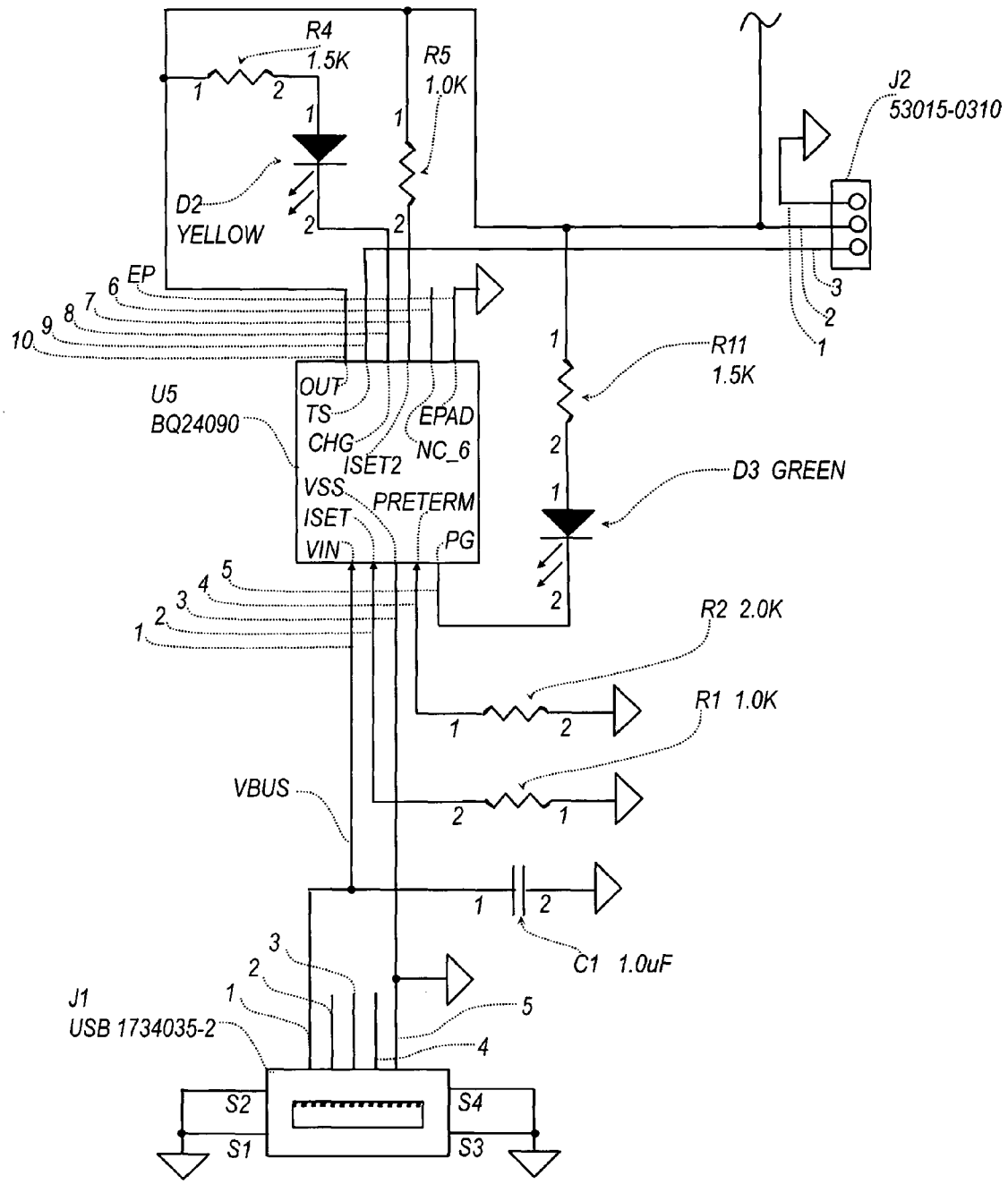
FIG. 6F depicts a caricature of a lower right portion of an electrical circuit according to the invention.

The term "filter circuit element" refers to a programmable circuit component that is programmed (i.e., coded) with a logic filter, as for instance shown in FIG. 5. Because the filter is in the form of software and represents logic, a filter circuit element could alternatively be called a "filter coded element". In particular embodiments the programmable circuit component is a field programmable gate array (FPGA) device. The filter reduces the presence of extraneous elements of sound in the electronic signature of an emulation. Particularly useful filters for purposes of the invention include Kalman filters but it is not so limited. An illustrative, nonexclusive example of a suitable and typical FPGA component for coding with a Kalman filter is Altera's Stratix II, EP2S60 component.

A "Kalman filter circuit element" refers to a device that is programmed to apply Kalman filter logic to improve the signal-to-noise ratio. Kalman filter logic employs recursive non-linear analysis and a system dynamics model to screen out so-called noise based on weighted averages and covariances for predicted and measured states for the signal over time. FIG. 5 shows an illustrative non-exclusive embodiment for recursive logic steps in a Kalman filter circuit element. The Kalman gain matrix provides a series of equations for the logic that are to be solved by matrix math. The state prediction function predicts the next value of the signal based on its most recent value or series of values. The delay function enables comparison of an actual signal to an immediately prior prediction for its value. The cost function optimizes the signal to noise ratio. Note again that the Kalman Filter is installed as a program (also known as firmware). A typical component bearing Kalman filter logic is a field programmable gate array (FPGA); an illustrative, nonexclusive example of a suitable and typical FPGA component for this purpose is Altera's Stratix II, EP2S60 component.

The term "comparative assessment" refers to a comparison between a music student's emulation attempt and an expert template that is the sof the emulation.

The term "performance score" refers to a metric for characterizing the relative merit of an emulation with respect to one or more attributes. The scores provided are optionally on a scale of 0 to 1 as depicted in FIG. 5. Alternatively the scores may be on a scale of −1 to 1, 0 to 100, −100 to 100, or any arbitrary range. In some embodiments the scores may be non-numeric. The performance score is reported in a form that is selected from the following group: alphanumeric; percent accuracy; statistical deviation; statistical variance; number of relative merits or demerits; qualitative ranking; and graphic overlay of a single or composite waveform from an emulation over a corresponding single or composite waveform from a template. The term relative merits or demerits includes but is not limited to: showing a certain number of points out of an ideal, e.g., three stars out of five, negative two guitars where negative three is the worst, and so forth; ranking against other students as in a game or competition; a ranking in terms of the student's own prior performances; and so forth. By qualitative ranking is meant: a term such as good, fair or poor; a smiley face or other emoticon that corresponds to the emulation quality; or other non-quantitative indication of the relative quality of emulations.

The term "comparable range" as used with respect to a performance score refers to scores that fall within the same or similar ranges as pre-defined in a performance scoring algorithm.

The term "reporting" as used with respect to a performance score refers to showing the performance score to a student in a visual form such as text character or images, audio form such as by spoken words or musical sounds, or tactile means such as through pulses in a vibrator. The performance score may be reported for a single attribute, as separate scores for a plurality of attributes, or as a composite for a plurality of attributes of the emulation.

The term "feedback information" refers to a pre-recorded or programmed response to an emulation attempt. The feedback may be the form of verbal praise or consolation; encouraging words; adding or subtracting game points as a function of performance merit; a depiction of how the template sound is played by an expert; verbal instructions for improvement; and a fact or other assertion about how an expert personally overcome a similar challenge in an unusual way. Depictions may be still photos, videos, graphics, animated caricatures, or other depictions.

The terms "transducer" and "audio transducer" are synonymous and refer to a transducer used for the purpose of converting sound waves from an instrumental and or vocal performance to signals of another type of energy, or vice versa. Suitable transducers include but are not limited to piezoelectric, electrical, electro-mechanical, electromagnetic, and photonic transducers.

The term "in electrical communication" as used in respect to two electrical components refers to their mutual presence on the same circuit, wherein one or both components is able to receive electrical current that has passed through the other.

The term "programming" refers to providing instructions to a component or to a circuit subset. The term programming includes but is not limited to: programming of settings by a user, such as for the settings of a microcontroller; programming of other electronic components in a circuit by a microcontroller located on that circuit; and the like. The term "control" refers to management of electrical or electronic signals by monitoring them, routing them, switching electronic components on or off, modifying attributes of the signals, or the like.

The term "digital signal processor" (DSP) refers to a component that is capable of editing digital signals, optionally under the control of stored instructions from a microcontroller. By editing is meant that suitable digital signal processors are capable of deleting, amending, adding to, coding, decoding, compressing and decompressing digital signals.

The term "FPGA" refers to a field programmable gate array that adds information to a digital electrical signal to prepare it for wireless transmission (i.e., "encodes" it) or removes information from a wirelessly received digital electrical signal (i.e., "decodes" it) to prepare it for processing that will restore it to audio form. The term "formatting for wireless transmission" refers to information that is added reversibly to electrical signals for purposes of wireless data transfer.

With reference to stringed instruments the terms used herein have the additional following meanings. The term "sound box" refers to a hollow harmonic chamber underneath the platform defined by the upper surface of the instrument. The terms "ingress" and "egress" refer to an orifice defined by the top surface of the sound box. The term "sound board" refers to a stringed instrument's platform defined by the upper surface of the instrument but lacking a hollow cavity.

The term "on board" refers to electrical and electronic components that are held on or near to an instrument's surface or a vocalist's mouth. The term on board includes but is not limited to components that are integrated into the construction of an instrument.

The term "pickup sensor" refers to an audio transducer.

Figures

The invention may be understood by examining the Figures and the illustrative embodiments discussed therein, as follows.

FIG. 1 shows a caricature of an illustrative system for use with the invention method, depicting devices for producing a template stringed musical sound and for a student's attempt to reproduce it. A stringed instrument (10) comprises a neck and fret board (30) and an optional harmonic ingress/egress (20) that if present is defined by the top surface of a sound box containing a hollow cavity. An example of a stringed instrument with such an ingress/egress and cavity is an acoustic guitar. Alternatively the instrument body may be solid and have no ingress/egress; many electric guitars, for example, have a solid-body construction. The stringed instrument (10) in FIG. 1 additionally comprises a fret board (30) overlaid on a neck, wherein frets (e.g., 50) are optionally distributed along the face of the fret board. The stringed instrument (10) also comprises a plurality of strings (40) that are stretched taut and raised slightly above the fret board and its frets, typically being raised more above the frets that are nearest to the egress/ingress. Frets are well known in the arts of stringed music as a series of precisely spaced periodic protrusions that provide fulcrum points for shortening the vibrating sector of a string to facilitate selection of a harmonic interval for the frequency of its vibrations. An electronic signature for a template note or chord is provided by an audio processing apparatus (80); the template signature is transmitted through a training-side audio cable (70) and the template note or chord is emitted from an audio speaker or headphones (60). A student's attempt to emulate the template sound by playing one or more of the strings (40) produces audible student tones (110) that are received at a sound propagation unit (100) that comprises a microphone, piezoelectric transducer, or electromagnetic pickup sensor. An electronic signature for the student's play is conveyed through a student-side audio cable (90) into an audio processing apparatus (80).

Figure 2:
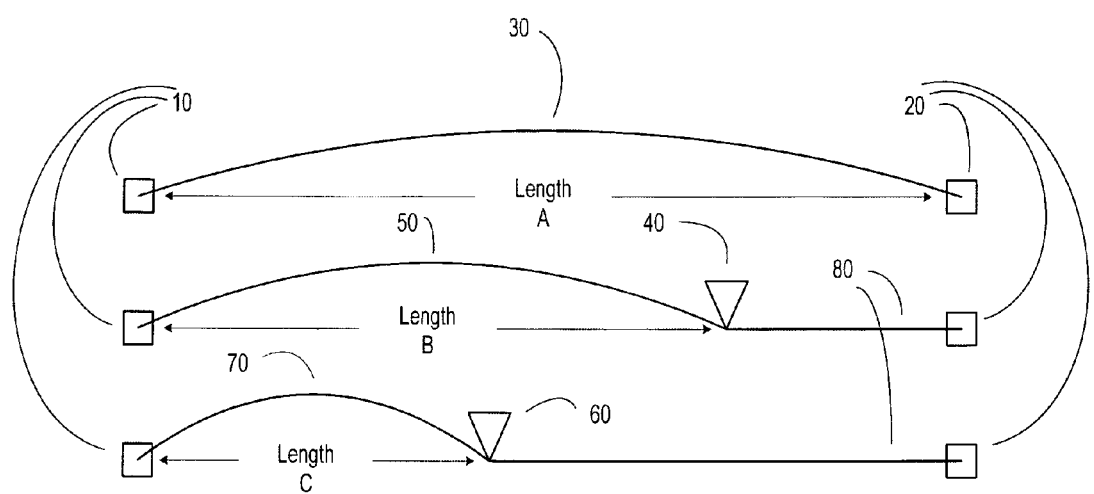
FIG. 2 shows a caricature of vibration modes for a single string on an instrument, as varied by the location of finger placement on the string.

FIG. 2 shows a caricature of vibration modes for an illustrative single string on an instrument, as varied by the location of finger placement on the string. A bridge (10) anchors a constant position on the string to one end of an instrument, typically at the instrument's lower end. A tuning key (20) anchors the string to the other end of the instrument, and enables the distance between anchored positions to be modestly variable. FIG. 2 shows three cases for obtaining frequencies from the string. When the string's full length between anchors is used, the distance is Length A, and during string vibration the maximum displacement is at the string's midpoint (30), and thus the string's half length between anchors determines the lowest frequency of sound that the string can make when played. When a string is depressed by a finger such that it is held tightly against an upper fret (40), the string's effectively available portion for vibration is Length B, and the mid-point (50) of length B represents the location of the new maximum displacement. Because Length B is shorter than Length A, the string has a higher frequency when held against the upper fret (40) than when the string is allowed to vibrate along the entirety of Length A. When a string is depressed by a finger such that it is held tightly against a lower fret (60), the string's effectively available portion for vibration is Length C, and the mid-point (70) of length C represents the location of the new maximum displacement. Because Length C is shorter than Length B, the string has a higher frequency when held against fret (70) than when the same string is held against fret (40).

Figure 3:
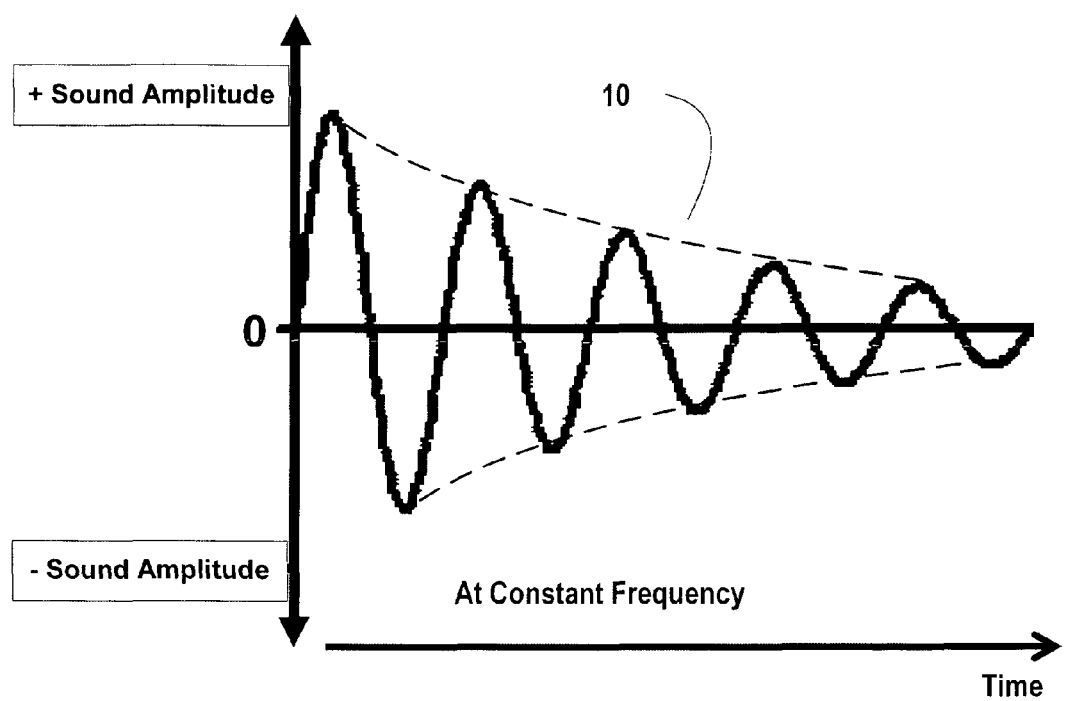
FIG. 3 shows a caricature illustrating a typical musical wave shape in the time domain.

FIG. 3 shows a caricature illustrating a representative musical wave shape in the time domain. In this case the wave is a simple damped sinusoidal wave. The constant oscillatory frequency and simple sinusoidal form is typical of a single note. The uniform attenuation of amplitude over time is characterized by the concave wave envelope (10) and is typical of a volume that fades at a regular rate. Using a musical instrument to emulate such decay rates precisely requires skill. Waveforms can be transformed readily into electrical analog electrical signals, digitized and modeled for comparison to a template and for tutorial feedback. For instance, in this case the waveform can be modeled as String Vibration=$A*\exp(-k*t)*\sin((2\pi f+\phi))$, where: "A" is the initial maximum amplitude as determined by the wave envelope, "exp" is the natural exponent; the parameter "k" is a function of string diameter, tautness and composition; "t" is time in (for instance) seconds; "$\pi$" is the geometric constant 3.14159 . . . ; "f" is the frequency of the tone, and "$\phi$" is a delay factor that may depend on the choice of transducer to transform audible sound into electronic signals. The waveform and characteristic equation may be used as input and output signals for an audio processing apparatus.

Figure 4:
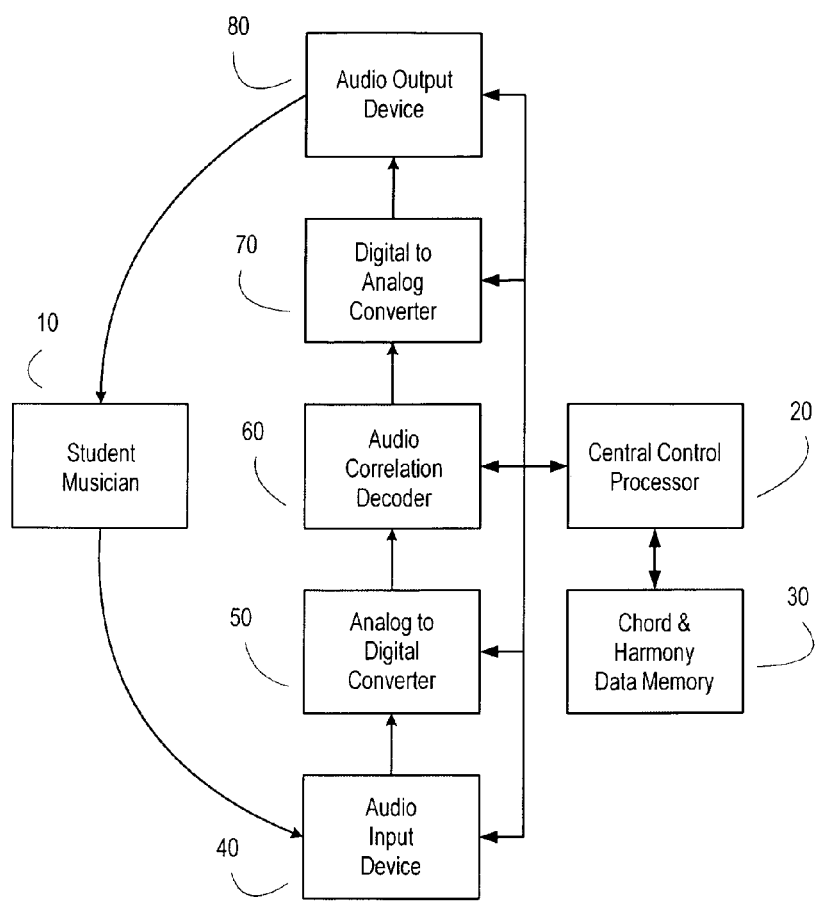
FIG. 4 shows a caricature illustrating the sequence of logic functions in a particular embodiment of the invention method.

FIG. 4 shows a caricature illustrating the sequence of logic functions in a particular embodiment of the invention method. The student musician (10) initiates a practice session by selecting a lesson from a menu. In certain embodiments the student selects a lesson on a video touch screen for retrieval by a central control processor (20). In particular embodiments the lesson may pertain to notes, arpeggios, scales, chords, modes, timing, signature times, rhythm, melodies, harmonies, and quickness to emulate. The central control processor (20) retrieves the selected lesson from the chord and harmony data memory (30) and transfers a corresponding musical template (such as a note, chord, arpeggio, scale, rhythm, melody or harmony) in digitized form to a temporary memory located in the audio correlation decoder (60). This template is the reference used to gauge the student's (10) success level in mastering the technique represented by the template. The template is routed to a digital-to-analog converter (70) for conversion to analog form, which is then routed to an audio output device (80) for transformation to audible form. The audio output device transfers the signal either over a transmission line or wirelessly to, for instance, a loudspeaker. The audible template then emanates from the audio output device and is heard by the student musician (10), who then attempts to replicate the template on a stringed instrument. An audio input device (40) receives the student's audible emulation attempt, which may be sent from the instrument's on-board electronics either in wired form or wirelessly. The audio input device (40) then transforms the emulation from audible form into an electrical analog signal that is subsequently digitized by an analog to digital Converter (50). The digitized chord or harmony is transferred into the audio correlation decoder (60). In particular embodiments one or more of the audio input device (40), analog to digital converter (50), audio correlation decoder (60), digital to analog converter (70) and audio output device (80) is programmed by and or under the control of the central control processor (20). In certain embodiments all of components 40, 50, 60, 70 and 80 are programmed by and under the control of the central control processor (20).

With respect to FIG. 4, a list of illustrative, nonexclusive examples of component parts suitable for use in the invention follows, listed by brand and part number: Texas Instruments AM389X for central control processor (20); Samsung K4H511638G for data memory (30); Texas Instruments TLV1012 for audio input device (40); Texas Instruments TLV320ADC3101 for analog-to-digital converter (50); Altera's Stratix II, EP2S60, for audio correlation decoder (60); Texas Instruments (Burr Brown) DSD1791 for digital-to-analog converter (70); and Texas Instruments TPA2008D for audio output device (80).

In certain embodiments the on-board electronics for the instrument are part of a larger system of circuits to process music digitally with high fidelity. In particular embodiments the larger system of circuits modifies the digital signature of student playing to remove artifacts that produce noise ingress, internally generated noise, truncated audio dynamic range, nonlinear amplitude responses, defective frequency responses or non-optimal audio time latency.

FIG. 5 shows a caricature illustrating the interrelationship of digital processing steps for comparing and scoring a student's stringed performance against a norm in a particular embodiment of the invention method. In particular, FIG. 5 illustrates certain audio processing details of the audio correlation decoder (60) in FIG. 4. As shown in FIG. 4, after a student plays the assigned exercise, i.e., attempts to emulate a particular musical template, that audible performance is transformed to an electrical analog form and then a digital form. The student's emulation is digitized; then without further processing it is stored in a first chord register for the student (30, FIG. 5), where the storage is either temporary or for a sustained period. The first chord register then sends that binary data to be processed by filter logic on a circuit element (100). The registers in FIG. 5 are memory or buffers; the memory may be temporary.

Logic filters use known art to identify artifacts and reduce their prominence, essentially averaging them out. In the present invention the filter is used to minimize the effects of ambient background sounds, electrical noise from alternating current power sources, and other audible artifacts, so as to optimize the clarity of the desired signal. Kalman filters are particularly useful in this respect. Stringed instruments also have structural characteristics that may distort the frequency, time domain signal amplitude (see FIG. 3), or decay time variables. In a particular embodiment of the invention, a Kalman Filter circuit element processes the signal by means of a Kalman gain matrix (40), followed sequentially and optionally reiteratively by processing in a delay function (50, allowing pattern recognition chronologically), a cost function (60, identifying the optimal value at each point in time), and a state prediction function (90, identifying the predicted next value based on weighted averages, for comparison with the actual next value).

Note that the Kalman filter (KF) graphic in FIG. 5 does not correspond to physical circuit components, but to purely logical processes that maximize the student's response and to minimize extraneous acoustic or electronic signals (e.g. room background sounds, and acoustic harmonic resonances characteristic of the particular stringed instrument). The KF is a superior form of electrical filter implemented in a software (i.e., firmware) domain. The KF can be encoded on the same circuit component that is used for the audio correlation decoder (i.e., for the correlator), or encoded on a different component. In a particular embodiment the component serving as the audio correlation decoder is a FPGA that also has the KF encoded on it.

Kalman filters in general provide better results than do linear filter implementations, but either can be used. One issue to be aware of when using a linear (i.e., non-Kalman) class of logic filters is that often they have more noise variance than do Kalman filters. The higher variance may result in a less accurate (hence less fair) representation of the student's emulation as played at the instrument. But either type of logic filter can be used.

In FIG. 5, after being processed by logic-based filtering the digitized emulation is stored in a second chord register for the student, either temporarily or on a sustained basis. The processed signals in the student's second chord register (80) are then sent to a chord correlator (20). A digitized ideal musical template is drawn from a trainer chord register (10) and sent to the same chord correlator (20) for comparison. The correlator (20) then compares a statistical cross-correlation to compare the inputs from the student's register for processed data (i.e., 30) and the trainer register (i.e., 10). The correlator (50) in FIG. 5 represents the signal path in FIG. 4, between the audio correlator decoder (60, FIG. 4) and central control processor (20, FIG. 4). The student's emulation's accuracy in mimicking the template provided by the apparatus is reflected in a score. The metrics used for assessing the quality of the student's attempt may be selected from the group consisting of frequency, amplitude, decay rate for amplitude, timing, clarity of articulation for the sound, promptness in emulating, and other metrics. The scores provided are optionally linear. The scores provided are optionally on a scale of 0 to 1 as depicted in FIG. 5. Alternatively the scores may be on a scale of −1 to 1, 0 to 100, −100 to 100, or any arbitrary range. In some embodiments the scores may be non-numeric. In certain embodiments the scores may be reinforced by a recorded video, animation or simulation of a successful musician giving encouragement, correction, advanced tips, anecdotes or other verbal or non-verbal follow-up in response to a particular range of score by the student.

FIG. 6 shows a caricature of a detailed circuit diagram that is suitable for use with the present invention, specifically to provide circuit components 40, 50, 70 and 80 depicted in FIG. 4. Circuit components 20, 30 and 60 from FIG. 4 may employ the commercially available products and part numbers cited earlier in this application. The circuit shown in this figure (FIG. 6) and related circuits have been described and claimed in a co-pending U.S. patent application by Raley and Carnes entitled "Improved Circuits to Process Music Digitally with High Fidelity," filed Jun. 4, 2011, the disclosure of which is incorporated in its entirety herein. However the instant invention is not limited to use of those circuits.

Further advantages of the invention include its ability to interface with or be integrated with other wireless systems. Currently game consoles with wireless elements such as for the Wii® and Rock Band® systems rely on performance metrics derived from accelerometers or fingering detection on a crude approximation of an instrument as opposed to evaluation of the actual sound from an emulation on an authentic stringed instrument, thus the current tutorial value of such consoles is limited for stringed instruments. The invention method enables use of such consoles with much higher tutorial productivity, and simultaneously the game elements of such consoles add considerable interest to a student's practice time.

Note that the descriptions above omit certain aspects of circuit design and logic sequence, such as the choice and configuration of various mundane components including the power supply and the computational clock. However criteria for their specifications and selection are well known to practitioners of ordinary skill in the electronic arts.

The embodiments of the invention as described herein are merely illustrative and are not exclusive. Numerous additions, variations, derivations, permutations, equivalents, combinations and modifications of the above-described composition and methods will be apparent to persons of ordinary skill in the relevant arts. The invention as described herein contemplates the use of those alternative embodiments without limitation.

What is claimed is:

1. An electronic method for tutoring a student to use a stringed musical instrument, wherein the method comprises:
   (a) selecting a lesson topic from an electronic menu;
   (b) activating the selected lesson topic, wherein the activation comprises the steps of:
      (i) retrieving the selected lesson topic from a memory component by means of a control processor;
      (ii) identifying a digital musical template corresponding to the lesson topic by means of the control processor;
      (iii) storing the digital template in memory associated with a correlator for subsequent comparison to a played emulation from the student;
      (iv) transforming the template to analog form by means of a digital-to-analog converter device; and
      (v) transforming the template analog form to an audible sound by means of an audio output device; wherein steps (iii) and (iv) are performed in any order relative to each other;
   (c) pre-treating the student's emulation of the audible sound from the template, wherein the pre-treatment comprises the following steps:
      (i) receiving the student's emulation by means of an audio input device that transforms audible sound to an analog electrical signal;
      (ii) transforming the analog electrical signal from the student emulation to digital form in an analog-to-digital converter device;

(iii) optionally processing the student's emulation resulting from steps (i) or (ii) in a logic filter element to reduce extraneous elements of sound;

(iv) storing the digitized, optionally filtered emulation in a memory associated with a correlator for subsequent comparison to the digital template;

(d) providing a comparative assessment at a correlator device, comprising the steps of:

(i) comparing the digital musical template and the digitized, optionally filtered emulation with regard to at least one attribute selected from the group consisting of frequency, rate of frequency change, wavelength, rate of wavelength change, amplitude, rate of amplitude change, wavelength phase, rate of wavelength phase change, articulation quality of notes, timing between notes, promptness in emulating, and consistency of repeated emulations with respect to any of these attributes;

(ii) assigning a performance score to the quality of the match between the digitized, optionally filtered emulation and the digital musical template that it emulated;

(iii) reporting the performance score; and (iv) optionally providing feedback information that is retrieved from a memory device and or that is programmed, wherein the feedback information corresponds to a performance score that is identified as being in a comparable range for at least one attribute of the comparative assessment as reported.

2. The electronic method of claim 1, wherein the lesson pertains to the playing of a note, an arpeggio, a scale, a chord, a key, a mode, a rhythm, a time signature, a melody or a harmony.

3. The electronic method of claim 1, wherein the selection is made by means of a mouse click, a voice command, a touch screen, a typed code, a programmed instruction from an algorithm, a randomized choice from an algorithm, or an instruction sent wirelessly from a remote control device.

4. The electronic method of claim 1, wherein the selected lesson topic is retrieved from a permanent memory.

5. The electronic method of claim 1, wherein the selected lesson topic is retrieved from a temporary memory.

6. The electronic method of claim 1, wherein each selected lesson topic has at least one digital musical template associated with it in the same memory component.

7. The electronic method of claim 1, wherein each selected lesson topic has at least one digital musical template associated with it in a separate memory component.

8. The electronic method of claim 1, wherein the correlator is under the control of a processor control memory device.

9. The electronic method of claim 1, wherein the audio output device is selected from the group consisting of loud speakers and earphones.

10. The electronic method of claim 1, wherein the audio input device is selected from the group consisting of microphones, piezoelectric transducers, magnetic pick-up sensors, amplifiers and oscilloscopes.

11. The electronic method of claim 1, wherein the logic filter element is a Kalman filter circuit element that is programmed to perform at least the following steps: creating a Kalman gain matrix; performing a delay function; performing a cost function; and performing a state prediction; wherein that sequence of steps is optionally reiterative, and wherein the subset of the sequence of steps comprising the delay function and cost function is optionally reiterative.

12. The electronic method of claim 1, wherein the extraneous elements of sound that are reduced comprise at least one of background noise, ingress/egress noise, and internally generated noise.

13. The electronic method of claim 1, wherein the memory associated with the correlator is optionally temporary.

14. The electronic method of claim 1, wherein the memory associated with the correlator is optionally permanent.

15. The electronic method of claim 1, wherein at least on performance score is reported in a form that is selected from the following group: alphanumeric; percent accuracy; statistical deviation; statistical variance; number of relative merits or demerits; qualitative ranking; and graphic overlay of a single or composite waveform from an emulation over a corresponding single or composite waveform from a template.

16. The electronic method of claim 1, wherein the optional feedback information is provided in a form selected from the group consisting of: praise or consolation; encouragement; adding or subtracting game points as a function of performance merit; a depiction of how the template sound is played by an expert; verbal instructions for improvement; and a fact or other assertion about how an expert personally overcame a similar challenge in an unusual way.

17. The electronic method of claim 1, wherein the method is used to teach a student how to play music on a guitar in the physical absence of a human music instructor.

18. The electronic method of claim 1, wherein the audio input device is a pick-up on a guitar.

19. The electronic method of claim 1, wherein the method is used for a guitar, the audio input device is a pick-up, and the method uses a Kalman filter circuit element.

20. The electronic method of claim 1, wherein the method is used for a guitar, the audio input device is a pick-up, and communication of data occurs wirelessly between a first circuit comprising the pick-up and a second circuit comprising the control processor.

* * * * *